(12) United States Patent
Hillis et al.

(10) Patent No.: US 11,321,408 B2
(45) Date of Patent: *May 3, 2022

(54) DATA STORE WITH LOCK-FREE STATELESS PAGING CAPACITY

(71) Applicant: Applied Invention, LLC, Burbank, CA (US)

(72) Inventors: W. Daniel Hillis, Encino, CA (US); Eric Bax, Altadena, CA (US); Augusto Callejas, Pasadena, CA (US); Harry Kao, Pasadena, CA (US); Mathias L. Kolehmainen, Los Angeles, CA (US)

(73) Assignee: Applied Invention, LLC, Burbank, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 16/741,969

(22) Filed: Jan. 14, 2020

(65) Prior Publication Data
US 2020/0151233 A1    May 14, 2020

Related U.S. Application Data

(63) Continuation of application No. 14/639,009, filed on Mar. 4, 2015, now Pat. No. 10,552,496, which is a
(Continued)

(51) Int. Cl.
*G06F 16/955* (2019.01)
*G06F 16/9535* (2019.01)
(Continued)

(52) U.S. Cl.
CPC ...... *G06F 16/9535* (2019.01); *G06F 16/2471* (2019.01); *G06F 16/24578* (2019.01);
(Continued)

(58) Field of Classification Search
CPC . G06F 16/9535; G06F 16/2471; G06F 16/955
See application file for complete search history.

(56) References Cited

U.S. PATENT DOCUMENTS

| | | |
|---|---|---|
| 4,933,936 A | 6/1990 | Rasmussen et al. |
| 5,454,101 A | 9/1995 | Mackay et al. |
| | (Continued) | |

OTHER PUBLICATIONS

"U.S. Appl. No. 12/558,453 Non-Final Office Action dated Aug. 4, 2011", 10.

(Continued)

*Primary Examiner* — Eliyah S. Harper
(74) *Attorney, Agent, or Firm* — Perkins Coie LLP; Michael A. Glenn; Vikram Iyengar

(57) ABSTRACT

Disclosed are a method and apparatus for limiting the number of results returned by a data store in response to a query. Upon receiving an initial query, the data store returns a page of results that includes a subset of the data items within the data store satisfying the conditions of the query. The data store also provides a marker indicating the extent of the set of data items. If a subsequent query that requests additional results which satisfy the same query conditions and that includes the marker is received, the data store returns a page of results that includes a subset of data items that are disjoint from the initial subset, and provides an updated marker which indicates the extent of the union of the initial and subsequent subsets. If still further results are desired from the data store, an additional query containing the updated marker may be submitted.

20 Claims, 12 Drawing Sheets

Related U.S. Application Data continuation of application No. 11/301,985, filed on Dec. 12, 2005, now Pat. No. 8,996,486, which is a continuation-in-part of application No. 11/177,789, filed on Jul. 8, 2005, now Pat. No. 7,774,308.

(60) Provisional application No. 60/636,822, filed on Dec. 15, 2004.

(51) Int. Cl.
  *G06F 16/28* (2019.01)
  *G06F 16/2458* (2019.01)
  *G06F 16/2457* (2019.01)
  *G06F 16/33* (2019.01)

(52) U.S. Cl.
  CPC .......... *G06F 16/283* (2019.01); *G06F 16/955* (2019.01); *G06F 16/334* (2019.01)

(56) References Cited

U.S. PATENT DOCUMENTS

| | | | |
|---|---|---|---|
| 5,694,593 A | 12/1997 | Baclawski | |
| 5,758,347 A | 5/1998 | Lo et al. | |
| 5,799,322 A | 8/1998 | Mosher | |
| 5,857,207 A | 1/1999 | Lo et al. | |
| 5,870,764 A | 2/1999 | Lo et al. | |
| 5,924,090 A | 7/1999 | Krellenstein | |
| 6,016,489 A | 1/2000 | Cavanaugh et al. | |
| 6,018,524 A | 1/2000 | Turner et al. | |
| 6,026,413 A | 2/2000 | Challenger et al. | |
| 6,049,390 A * | 4/2000 | Notredame | G06K 15/00 358/1.15 |
| 6,061,700 A * | 5/2000 | Brobst | G06F 40/103 715/206 |
| 6,115,705 A | 9/2000 | Larson | |
| 6,173,317 B1 | 1/2001 | Chaddha et al. | |
| 6,308,169 B1 | 10/2001 | Ronstrom et al. | |
| 6,442,565 B1 | 8/2002 | Tyra et al. | |
| 6,442,691 B1 | 8/2002 | Blandford | |
| 6,484,161 B1 | 11/2002 | Chipalkatti et al. | |
| 6,578,131 B1 | 6/2003 | Larson et al. | |
| 6,601,021 B2 | 7/2003 | Card et al. | |
| 6,876,656 B2 | 4/2005 | Brewer et al. | |
| 6,904,454 B2 | 6/2005 | Stickler | |
| 6,996,584 B2 | 2/2006 | White et al. | |
| 7,047,242 B1 | 5/2006 | Ponte et al. | |
| 7,080,088 B1 | 7/2006 | Lau | |
| 7,080,139 B1 * | 7/2006 | Briggs | G06Q 30/0256 709/224 |
| 7,116,666 B2 | 10/2006 | Brewer et al. | |
| 7,127,551 B2 | 10/2006 | Beck | |
| 7,146,369 B2 * | 12/2006 | White | G06F 16/972 |
| 7,151,548 B1 | 12/2006 | Hirono | |
| 7,152,165 B1 | 12/2006 | Maheshwari et al. | |
| 7,254,570 B2 * | 8/2007 | Stickler | G06F 16/93 |
| 7,254,577 B2 | 8/2007 | Gupta et al. | |
| 7,281,024 B1 | 10/2007 | Banerjee et al. | |
| 7,290,019 B2 | 10/2007 | Bjorner | |
| 7,313,581 B1 | 12/2007 | Bachmann et al. | |
| 7,437,338 B1 * | 10/2008 | Forman | G06N 20/00 706/20 |
| 7,512,638 B2 | 3/2009 | Jhaveri et al. | |
| 7,590,635 B2 | 9/2009 | Hillis et al. | |
| 7,593,904 B1 * | 9/2009 | Kirshenbaum | G06F 16/285 706/12 |
| 7,747,655 B2 | 6/2010 | Hull et al. | |
| 7,774,308 B2 | 8/2010 | Hillis | |
| 8,024,377 B2 | 9/2011 | Hillis | |
| 8,140,559 B2 * | 3/2012 | Bobick | G06F 40/247 707/761 |
| 8,140,599 B1 | 3/2012 | Patterson | |
| 8,949,237 B2 * | 2/2015 | Balcan | G06Q 10/10 707/737 |
| 8,996,486 B2 | 3/2015 | Hillis et al. | |
| 2002/0036617 A1 | 3/2002 | Pryor | |
| 2002/0052872 A1 | 5/2002 | Yada | |
| 2002/0056136 A1 | 5/2002 | Wistendahl et al. | |
| 2002/0059272 A1 | 5/2002 | Porter | |
| 2002/0064280 A1 | 5/2002 | Gassho | |
| 2002/0156798 A1 | 10/2002 | Larue | |
| 2002/0193974 A1 * | 12/2002 | Ben-David | G06F 30/3323 703/2 |
| 2002/0194166 A1 | 12/2002 | Fowler | |
| 2003/0023609 A1 | 1/2003 | Della et al. | |
| 2003/0051066 A1 | 3/2003 | Pace et al. | |
| 2003/0163597 A1 | 8/2003 | Hellman et al. | |
| 2003/0208472 A1 | 11/2003 | Pham | |
| 2003/0217081 A1 | 11/2003 | White et al. | |
| 2004/0177100 A1 | 9/2004 | Bjorner et al. | |
| 2004/0236720 A1 | 11/2004 | Basso et al. | |
| 2005/0021817 A1 | 1/2005 | Shimizu et al. | |
| 2005/0060647 A1 | 3/2005 | Doan et al. | |
| 2005/0149544 A1 * | 7/2005 | Bishop | G06Q 20/04 |
| 2005/0185578 A1 | 8/2005 | Padmanabhan et al. | |
| 2005/0193024 A1 | 9/2005 | Beyer et al. | |
| 2005/0203901 A1 | 9/2005 | Waldvogel et al. | |
| 2005/0207353 A1 | 9/2005 | Goryavsky | |
| 2005/0289120 A9 | 12/2005 | Soulanille et al. | |
| 2006/0022955 A1 | 2/2006 | Kennedy | |
| 2006/0026117 A1 | 2/2006 | Raman et al. | |
| 2006/0026444 A1 | 2/2006 | Asano et al. | |
| 2006/0129517 A1 | 6/2006 | Hillis | |
| 2006/0129540 A1 | 6/2006 | Hillis et al. | |
| 2006/0168154 A1 | 7/2006 | Zhang et al. | |
| 2006/0218167 A1 | 9/2006 | Bosley et al. | |
| 2006/0257053 A1 | 11/2006 | Boudreau et al. | |
| 2006/0267998 A1 | 11/2006 | Walls et al. | |
| 2007/0006119 A1 | 1/2007 | Price | |
| 2007/0061817 A1 | 3/2007 | Atkinson et al. | |
| 2007/0174483 A1 | 7/2007 | Raj et al. | |
| 2015/0178399 A1 | 6/2015 | Hillis et al. | |

OTHER PUBLICATIONS

"Content Addressable Network", retrieved online from url: http://en.wikipedia.org/siki/Content_addressable_network, May 2005, 1 page.

"Content-Addressable Network Model", Information Visualization Cyberinfrastructure, SLIS Indiana University, Jul. 10, 2004, 3 pages.

Abiteboul, et al., "Compact Labeling Schemes for Ancestors Queries", Symposium on Discrete Algorithms, ISBN 0-89871-4907, specifically p. 554, ISBN 0-89871-4907, specifically p. 554, Jan. 2001, 547-556.

Bosworth, Adam, "IT Conversations New Ideas Through Your Headphones", Santa Clara, California, Apr. 18-25, 2005, 1-5.

Cesa-Bianchi, NICOLò, et al., "Minimizing regret with label efficient prediction", IEEE, vol. 51, Jun. 2005, pp. 2152-2162.

Crespo, et al., "Semantic Overlay Networks for P2P Systems", Technical Report, Stanford University, Jan. 2003, Total of 16 pages.

Dean, Jeff, "Google's Big Table", Google Blogoscoped, by Philipp Lenssen, Univ. of Washington, Oct. 18, 2005, 4 pages.

Deng, Chao, et al., "Multi-Agent Framework for Distributed Systems", Aug. 26-29, 2004; IEEE, vol. 1, 22-25.

Duong, et al., "LSDX: a new labelling scheme for dynamically updating XML data", ACM, Jan. 2005, pp. 185-193.

Huebsch, et al., "Querying the Internet with PIER", Proceedings of the 29th VLDB Conference, Berlin, Germany, Sep. 2003, 12 pages.

Larson, "Dynamic Hash Tables", Communications of the ACM, vol. 31, No. 4, Apr. 1998, pp. 446-457.

Okubo, Takao, et al., "An Optimistic Method for Updating Information in Distributed Collaborative Work", Aug. 19-21, 1998; IEEE; Kawasaki, Japan, Dec. 27, 2012, 400-405.

Ratnasamy, et al., "A Scalable Content-Addressable Network", Proc. ACM SIGCOMM 2001, Aug. 2001, pp. 161-172.

Reed, David P., "Naming and Synchronization in a Decentralized Computer System", Massachusetts Institute of Technology, Sep. 1978, 188 pages.

(56) References Cited

OTHER PUBLICATIONS

Stonebraker, et al., "Mariposa: A Wide-Area Distributed Database System", The VLDB Journal, Dept of Electrical Engineering & Computer Sciences, Univ. of Calif. Berkeley, Jan. 1996, pp. 48-63.
Wade, S, "An Investigation into the Use of the Tuple Space Paradigm in Mobile Computing Environments", Ph.D Dissertation Lancaster University, England., Sep. 1999, 236 Pages.

* cited by examiner

DATA STORE WITH LOCK-FREE STATELESS PAGING CAPACITY

CROSS-REFERENCE TO RELATED APPLICATION(S)

This application is a continuation of U.S. patent application Ser. No. 14/639,009, entitled "DATA STORE WITH LOCK-FREE STATELESS PAGING CAPACITY", filed Mar. 4, 2015, which is a continuation of U.S. patent application Ser. No. 11/301,985, entitled "DATA STORE WITH LOCK-FREE STATELESS PAGING CAPACITY", filed Dec. 12, 2005, now U.S. Pat. No. 8,996,486, issued Mar. 31, 2015, which claims priority to U.S. Provisional Patent Application Ser. No. 60/636,822, entitled "METHOD AND APPARATUS FOR DYNAMICALLY GENERATING ASSERTION-BASED PRESENTATIONS OF INFORMATION", filed Dec. 15, 2004, the entirety of each of which is incorporated herein by this reference thereto. U.S. patent application Ser. No. 11/301,985, filed Dec. 12, 2005, is also a continuation-in-part of U.S. patent application Ser. No. 11/177,789, entitled "ANTI-ITEM FOR DELETION OF CONTENT IN A DISTRIBUTED DATASTORE", filed Jul. 8, 2005, now U.S. Pat. No. 7,774,308, issued Aug. 10, 2010, the entirety of which is incorporated herein by this reference thereto.

TECHNICAL FIELD

The invention relates to data stores, and in particular to large scale distributed data stores.

BACKGROUND

In recent years, the need for reliable and efficient storage of large amounts of data has increased dramatically. Indeed the need for extensive storage has even outpaced the remarkable advances in storage technology, e.g. the increasing capacity and decreasing cost of hard disks, and processing power. As a result, storage of truly large amounts of data on a single server is in many cases impractical, and a distributed approach is desirable. Furthermore, even in those cases where storage can be handled by a single machine, a distributed data store may offer superior reliability and more efficient load handling.

At a recent conference of database users, Adam Bosworth envisioned a massive distributed data store through which "anyone can get to any data anywhere anytime". (*Database Requirements in the Age of Scalable Services*; O'Reilly MySQL Users Conference; Santa Clara, Calif.; (Apr. 18-21, 2005)). The data store would be completely scalable, use inexpensive, commodity components, and be capable of handling billions of transactions a day. Most importantly, it would allow even novice computer users to serve structured data to a world wide community of users conveniently, leading to an explosion of accessible information.

Such a data store would be to a querying client what the World Wide Web is to a browser. As such, it would share many characteristics with the World Wide Web. In particular, the data store would incorporate:

Partitioning. Data storage and retrieval and the associated workloads would be distributed across many nodes within a storage network.

Caching. Data would be stored locally on a temporary basis to minimize the effects of surges in requests for particular items within the data store.

Stateless Nodes. Responding to queries would require a node to maintain only a minimum amount of state information.

Coarse-Grained Interactions. Clients, servers, and other network nodes would interact relatively infrequently, sending, receiving, and operating upon chunks of data at a time.

To date, substantial effort has been directed at developing very large databases (VLDBs) that exhibit some of these characteristics. Notable examples include the Mariposa wide-area distributed database (Michael Stonebreaker, Paul M. Aoki, Witold Litwin, Avi Pfeffer, Adam Sah, Jeff Sidell, Carl Staelin, Andrew Yu; *Mariposa: a wide area distributed database system, VLDB Journal;* 5(1):48-63; (1996)) and the PIER massively distributed query engine (Ryan Huebsch, Joseph M Hellerstein, Nick Lanham, Boon Thau Loo, Scott Shenker, Ion Stoica; *Querying the Internet with PIER; Proceedings of the 29th VLDB Conference;* Berlin, Germany; (2003)).

Many VLDB systems, including the PIER query engine, are based upon content addressable networks (CANs). A CAN is based upon a multi-dimensional Cartesian coordinate space that spans the entirety of the data to be stored. Each computer that stores data is considered as a node within a graph. As a new node is added to the graph, it is dynamically assigned a subspace of the Cartesian coordinate space within the subspace of the node to which it is connected. The newly added node is henceforth responsible for storing and returning data items within the assigned subspace.

Inserting data into a distributed system and searching for data within, i.e. submitting queries to, a distributed system present well known challenges. The difficulty of responding to such requests may be simplified greatly if the algorithms used allow each node to consider only local information in responding to the request. In the case of a CAN, each node stores information indicating the subspace assigned to each of its nearest neighbors within the graph, and a greedy forwarding algorithm is used to propagate insert and query requests. Specifically, a node passes each request to the neighboring node with the assigned subspace closest to the location of the inserted or requested item within the Cartesian space. Each node thus acts upon purely local information, and does not need to coordinate with neighboring nodes to make routing decisions.

Nonetheless, difficulties may arise in distributed data stores when responding to search requests. Specifically, if a query associated with a search is propagated in an outwardly fanning manner to a number of nodes within the data store, and the data returned from the nodes are aggregated along the return path to the user, a bottleneck may ensue. This effect is particularly acute for those queries that entail the return of large amounts of data. As a data store grows larger and stores more data, this is increasingly the case.

It would therefore be desirable to provide a system for responding to queries of a distributed data store that minimizes the likelihood of a bottleneck should the act of responding to a query entail the return of large amounts of data. Furthermore, it would be desirable for the system to operate in a manner that is consistent with the goal of stateless nodes. Finally, the system should not require a user to anticipate a potential bottleneck but, rather, function in an automatic manner.

SUMMARY

The invention provides a method and apparatus for limiting the number of results returned by a data store in response to a query. Upon receiving an initial query, the data store returns a page of results that includes a subset of the data items within the data store satisfying the conditions of the query. The data store also provides a marker indicating the extent of the set of data items. If a subsequent query that requests additional results which satisfy the same query conditions and that includes the marker is received, the data store returns a page of results that includes a subset of data items that are disjoint from the initial subset, and provides an updated marker which indicates the extent of the union of the initial and subsequent subsets. If still further results are desired from the data store, an additional query containing the updated marker may be submitted.

The invention thus provides a solution to the bottlenecking problem that arises in distributed data stores when responding to queries having very large result sets. By providing a paging mechanism to limit the number of results returned, the invention restricts the amount of node resources used by a single query in a given period of time, thus preserving sufficient bandwidth for the execution of other data store operations.

The number of data items included in each successive page of results may be specified upon submission of the query. Alternatively, the number of data items included in each successive page may be based upon a default page size specified for the data store.

The data items within the data store are characterized by a total ordering that provides an ordinal ranking for each data item. The extent of the results returned may be defined by a greatest ordinal ranking. In the preferred embodiment of the invention, the ordinal ranking is based on a globally unique identifier (GUID). In responding to an initial query, the data store returns a page of results including the data items within the data store with GUIDs having lowest ordinal ranking. The marker provided is the GUID having the greatest ordinal ranking among the GUIDs of the data items within the page of results. In responding to subsequent queries, the data store retrieves from storage the data items having GUIDs having lowest ordinal ranking among the data items with GUIDs having greater ordinal ranking than that of the marker.

In one embodiment of the invention, the GUID includes a timestamp. In another embodiment the GUID includes a unique machine identifier. In the preferred embodiment of the invention, the GUID includes both a timestamp and a unique machine identifier, and it is stored within the data store.

Also in the preferred embodiment of the invention, the data store is a distributed, ordered tuple store composed of a number of nodes which are connected in a directed acyclic graph. Data items are stored by the nodes as tuples containing values stored in one or more fields. Preferably, each of the tuples within the data store includes a GUID stored as a field within the tuple, thus providing a basis for a total ordering of the tuples. Alternatively, the total ordering may be based on the values stored in one or more of the fields of each tuple.

The distributed, ordered tuple store may store data items on both a permanent and temporary basis, using disk- or RAM-based storage. The nodes within the distributed, ordered tuple store include servers that are capable of receiving a query from a client, repositories that are capable of storing data items on a permanent basis, and relays that do not store data items on a permanent basis.

A query submitted to the distributed, ordered tuple store includes a range of values specified for at least one of the fields. The range of values specified for a field may be a wildcard, indicating that the values of the field are not considered in returning the page of results.

To obtain results to a query, a node partitions the query into one or more subqueries; retrieves an internal page of tuples satisfying the conditions of the subquery from the local store of tuples within the node for each of a portion of the subqueries; forwards each of the remaining subqueries, as a query, to one or more other nodes within the distributed, ordered tuple store; receives a return page from each node to which a subquery was forwarded; merges the return pages and the internal pages to create a merged return page; and returns the merged return page as a return page. In the case of the node receiving the query from the client, the return page is returned to the client.

Preferably, the determination of which subqueries to forward and which subqueries to retrieve from the local store is based upon a storage range of the node that indicates which tuples are stored within the local store. The forwarding operation is based upon a coverage of each of the nodes to which the node is connected, indicating which tuples are accessible to each of the nodes. Finally, the merging operation preferably involves selecting the data items having lowest ordinal ranking from among the return pages and internal pages.

DETAILED DESCRIPTION

The invention provides a method and apparatus for limiting the number of results returned by a data store in response to a query. The invention is best understood with reference to a detailed description of a preferred embodiment of the invention in which the data store is a distributed, ordered tuple store.

Structure

Figure 1:
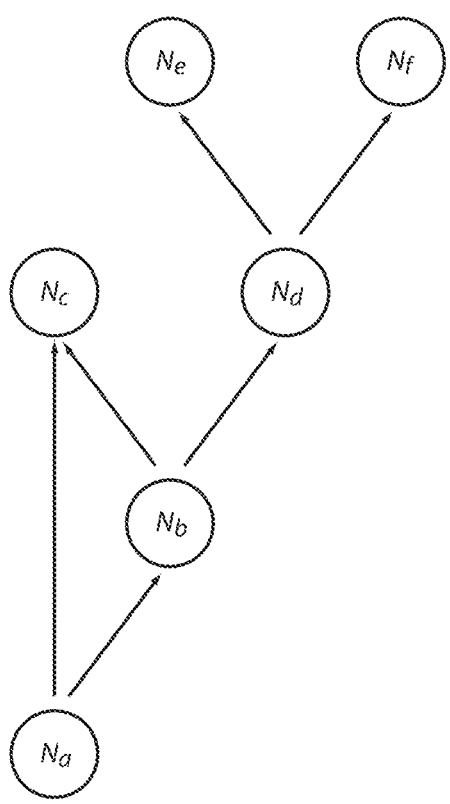
FIG. 1 shows the structure of a distributed, ordered tuple store according to the invention.

FIG. 1 shows the structure of a distributed, ordered tuple store according to the invention. The distributed, ordered tuple store consists of multiple interconnected nodes. In the preferred embodiment of the invention, the nodes are connected in a directed, acyclic graph as shown in FIG. 1, in which six interconnected nodes ($N_a$, $N_b$, $N_c$, $N_d$, $N_e$, and $N_f$) are illustrated.

Figure 2:
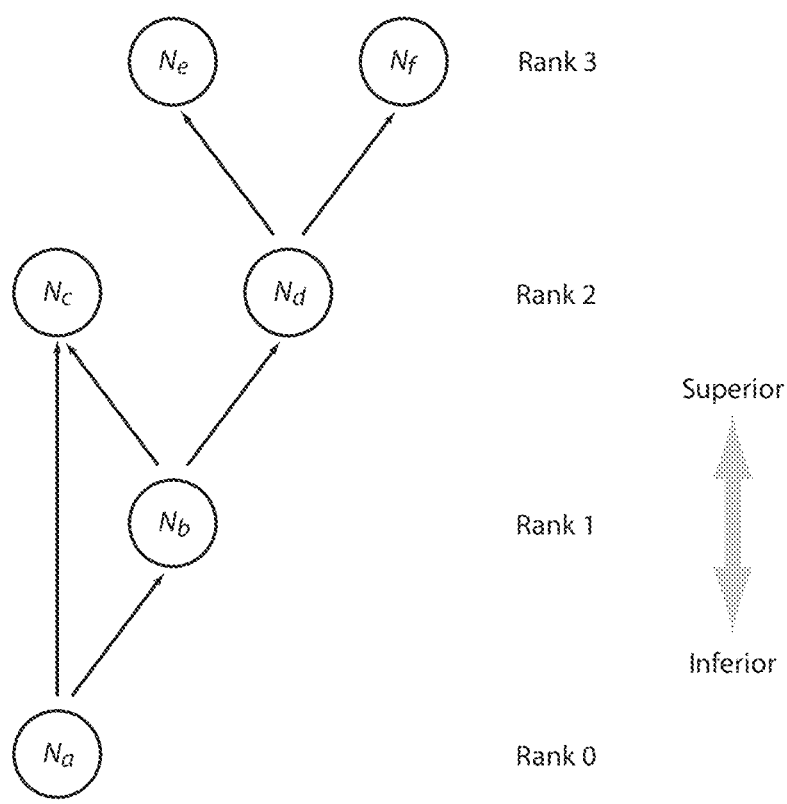
FIG. 2 shows the notions of superior nodes, inferior nodes, and rank within a distributed, ordered tuple store according to the invention.

FIG. 2 shows the notions of superior nodes, inferior nodes, and rank within a distributed, ordered tuple store according to the invention. As illustrated in the FIG. 2, nodes may be characterized by a rank. Nodes of lower rank are termed inferior, and nodes of higher rank are termed superior. In the preferred embodiment of the invention, nodes may only seek data from superior nodes, as indicated by the direction of the arrows in FIG. 2. That is, requests for data may be passed to superior nodes but may not be passed to inferior nodes. In this sense, superior nodes are said to lie upstream of inferior nodes, and inferior nodes are said to lie downstream of superior nodes. Each node that is directly connected to a downstream node by an upstream edge is an upstream neighbor of the downstream node. The set of upstream neighbors of a node is the termed the upstream neighborhood of the node.

The nodes within a distributed, ordered tuple store may be further classified as one or more of several node types. A repository is a node that stores a portion of the data within the distributed, ordered tuple store on a permanent basis, e.g. using disk-based storage. A relay is an intermediate node that connects to an upstream node, but does not store data on a permanent basis. Finally, a server is a node that facilitates communication with a computing devices outside the distributed, ordered tuple store, called a client. A node may, at its discretion, store a portion of the data within the distributed, ordered tuple store on a temporary basis, e.g. using a RAM-based cache. Also, a single node may be more than one of a repository, relay, and server.

Figure 3:
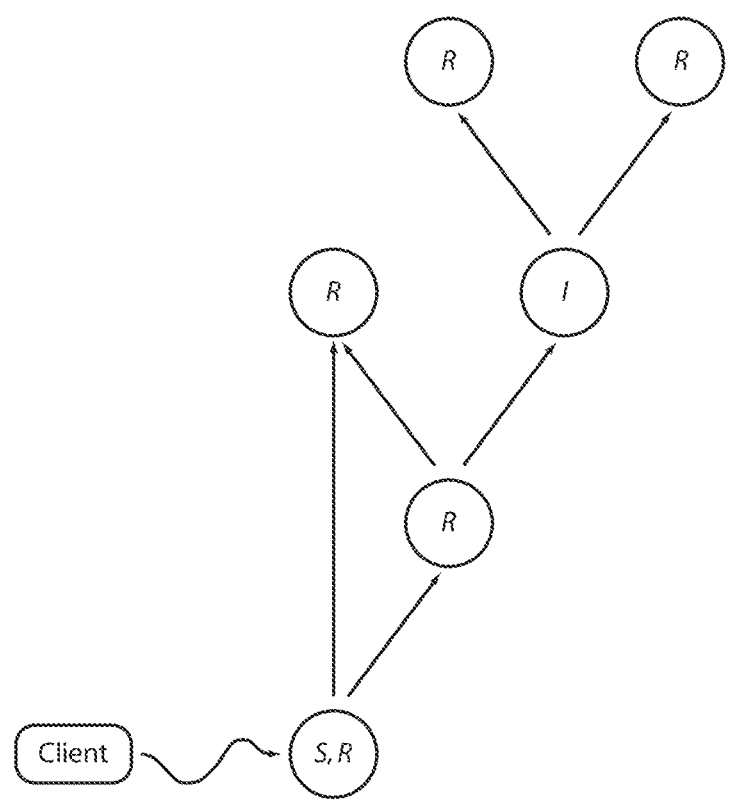
FIG. 3 shows a distributed, ordered tuple store incorporating nodes of several types according to the invention.

FIG. 3 shows a distributed, ordered tuple store incorporating nodes of several types according to the invention. In FIG. 3, node $N_a$ of FIG. 1 is a server S that supports a connection to a client. Node $N_a$ is also a repository R. Node $N_a$ is connected to two additional repositories R ($N_b$ and $N_c$ of FIG. 1). One of these repositories is further connected to an intermediate relay node ($N_d$ of FIG. 1). The relay is in turn connected to two more repositories R ($N_e$ and $N_f$ of FIG. 1).

Data within a distributed, ordered tuple store are characterized by a tuple space defined by N fields. Each field within the tuple space is defined by an ordered list of values $v_i$ that it may take on and an integer k that represents the position of the field within the tuple space. A field may thus be expressed as $$F_k \doteq \{v_1, v_2, \ldots v_i, \ldots, v_{M_k}\}. \tag{1}$$

In many instances, the ordered list of values is a range of integers. For example, a field may be defined as capable of taking an integer value between 1 and 10, inclusive. That is, $$F_x = [1,10]. \tag{2}$$

Other fields may take on any letter-based phrase shorter than a specified length, with the possible values ordered in an alphanumeric sense. That is, $$F_y = [a, zzzzz] \tag{3}$$

Note that a single distributed, ordered tuple store may contain data within a single tuple space or it may contain data within multiple tuple spaces.

Data items within the distributed, ordered tuple store thus take the form of tuples of length N, expressed as $$I \doteq (p_1, p_2, \ldots, p_j, \ldots, p_N), \tag{4}$$

where $p_j$ are values, selected from the jth field within the tuple space. Thus, for a tuple space $S_1$ defined as $$S_1 = \{F_1, F_2\} = \{[2,7], [4,13]\}, \tag{5}$$

one possible tuple is $$I = (3,8), \tag{6}$$

representing, for example the coordinates of a point in 2-D space. Similarly, for a tuple space $S_2$ defined as $$S_2 = \{F_3, F_4, F_5\} = \{[1,99], [a, zzzz], [a, zzzzzz]\}, \tag{7}$$

one possible tuple is $$I = (11, \text{Mary}, \text{Fluffy}), \tag{8}$$

representing, for example, the age, name, and pet of a particular person.

A field range is a contiguous subset of the indices into the ordered list of values that define a field. A field range is expressed as a pair of integers representing the ends of the range, inclusive. That is, $$r \doteq [i_{min}, i_{max}]. \tag{9}$$

As noted above, some of the nodes within the distributed, ordered tuple store, termed repositories, store data on a permanent basis. Each repository stores data for one or more of the tuples spaces within the distributed, ordered tuple store. The permanent storage duties of each node within a particular tuple space are defined by one or more hosting ranges. A hosting range is defined by one or more sets of N field ranges, each defining a subspace of the tuple space. For example, for the tuple space of Equation 5, the single set of field ranges $$H = \{[1,2], [6,7]\} \tag{10}$$

indicates that a node is responsible for storing tuples (2, 9), (2, 10), (3, 9), and (3, 10).

Alternatively, and often more conveniently, a hosting range may be expressed with pairs of tuples defining the corners of one or more subspaces. Each such subspace is termed a tile. For example, the hosting range of Equation 10 may be expressed by the single tile $$T = \{(2,9), (3,10)\}. \tag{11}$$

Figure 4:
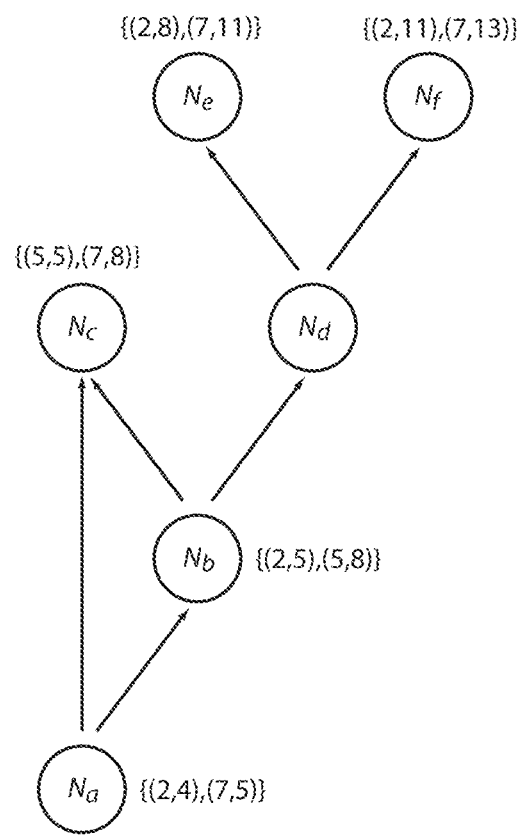
FIG. 4 shows a set of hosting ranges for the distributed, ordered tuple store of FIG. 1.

FIG. 4 shows a set of hosting ranges for the distributed, ordered tuple store of FIG. 1.

As noted above, nodes may also store data on a temporary basis, e.g. by using a RAM-based cache. The storage range of a node is the union of its hosting range and the tile or tiles of data within its temporary storage.

Figure 5:
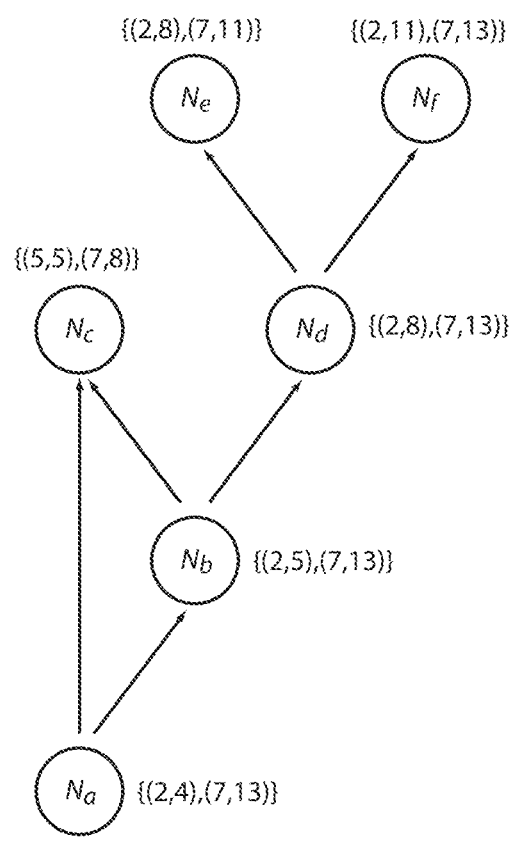
FIG. 5 shows the coverages resulting from the hosting ranges of FIG. 4.

FIG. 5 shows the coverages resulting from the hosting ranges of FIG. 4. The coverage of a node is the union of its hosting range and the hosting ranges of the nodes in its upstream neighborhood. In the preferred embodiment of the invention in which the nodes are connected in a directed acyclic graph, the coverage is defined by the superior nodes to which the node is connected.

A node is said to have full coverage of a tuple space if its coverage spans the entire tuple space. For any tuple within the tuple space, a node with full coverage either hosts the tuple itself, or is connected to a superior node that provides coverage of the tuple. By definition, a node is of rank zero if and only if it has full coverage.

So that each node may calculate its coverage, each node advertises its coverage to the inferior nodes to which it is connected. In the simplest embodiments of the invention, an administrator configures the network of nodes, explicitly indicating the connectivity between nodes, and the hosting ranges of each. This calculation must be performed once upon system configuration. In more sophisticated embodiments of the distributed, ordered tuple store, the connectivity of nodes and the hosting ranges of the nodes may be adjusted dynamically in response to measured system loads. In such systems, the advertising of coverage occurs on an ongoing basis.

Operations

In the preferred embodiment of the invention, a distributed, ordered tuple store supports insert, delete, and query operations. As noted above, a client communicates with a server to initiate an operation and to receive any data returned by the operation, e.g. in the case of a query operation. Briefly, an insert operation adds a specified set of tuples to the distributed, ordered tuple store, a delete operation removes a specified set of tuples from the distributed, ordered tuple store, and a query operation retrieves a specified set of tuples from within the distributed, ordered tuple store.

Insertion

Insertion of data into the distributed, ordered tuple store is performed by a client that connects to a server within the distributed, ordered tuple store. In the preferred embodiment of the invention, requests to insert data are only passed from inferior nodes to superior nodes. Further, to ensure that any tuple within the tuple space can be inserted properly, a client connects only to nodes of rank zero.

Figure 6:
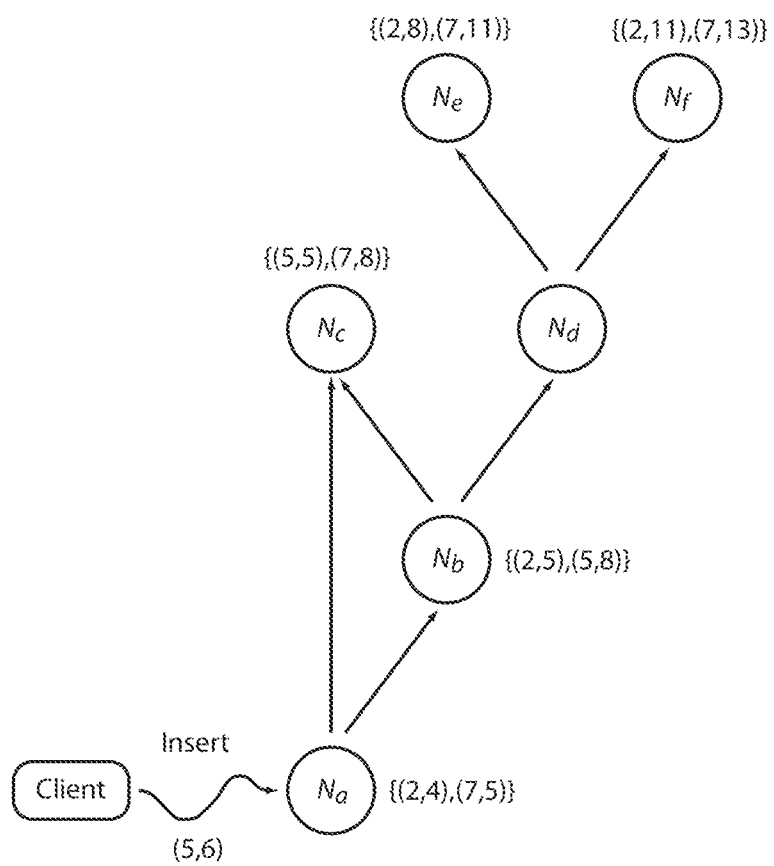
FIG. 6 shows the insertion of a tuple according to the invention.

FIG. 6 shows the insertion of a tuple according to the invention. The client inserts the tuple (5, 6) at node $N_a$. Because node $N_a$ is of rank zero, the inserted tuple is within its coverage. However, the inserted tuple is not within the hosting range of node $N_a$, so node $N_a$ does not store the tuple locally. Node $N_a$ then considers the coverage of the superior nodes to which it is connected and passes the insertion request to one or more of those superior nodes that provide coverage for the inserted tuple. The number of nodes to which the tuple is passed is based on the amount of redundancy desired in the distributed, ordered tuple store. In the distributed, ordered tuple store of FIG. 5, both nodes $N_b$ and $N_c$, provide coverage for the tuple (5, 6), and we consider the case in which node $N_a$ passes the insertion request to both nodes.

$N_b$ receives the insertion request. The inserted tuple is within the hosting range of node $N_b$, so node $N_b$ stores the tuple locally. After storing the tuple locally, node $N_b$ considers the coverage of the superior nodes to which it is connected. The inserted tuple is within the coverage of node $N_c$, but not within the coverage of node $N_d$. Node $N_b$ therefore passes the insertion request to node $N_c$, but not to node $N_d$.

Thus, node $N_c$, receives two insertion requests for the tuple (5, 6). Upon receipt of the first insertion request, node $N_c$, determines that the tuple is within its hosting range. The tuple is therefore stored locally. Upon receipt of the second insertion request, node $N_c$, again determines that the tuple is within its hosting range. However, node $N_c$, notes that it has already received the insertion request and that the inserted tuple is already within its local storage. Node $N_c$, therefore ignores the second insertion request. Because node $N_c$, is not connected to any superior nodes, the insertion operation terminates.

Deletion

The deletion operation for a distributed, ordered tuple store is summarized here, but is described in more detail in the referenced utility patent application "Anti-Item for Deletion of Content in a Distributed Datastore". The deletion operation is most easily implemented through the addition of a deletion field to the tuple space, where the deletion field make only take on the values 0 or 1. For example, the tuple space of Equation 5 may be extended to include a deletion field, yielding $$S_1 = \{F_1, F_2, F_d\} = \{[2,7],[4,13],[0,1]\}. \tag{12}$$

The deletion field $F_d$ is added solely to differentiate tuples from anti-tuples. All tuples are of the form (a, b, 0), and all anti-tuples are of the form (c, d, 1). The deletion field is not used in determining where within the data store a particular tuple is stored. That is, all nodes must store both tuples and anti-tuples.

Actual deletion from the distributed, ordered tuple store proceeds in a manner highly analagous to the insertion operation. A client connects to a node of rank zero, and requests, for example, the deletion of a tuple (5, 6, 0) by inserting the corresponding anti-tuple (5, 6, 1). The insertion of the anti-tuple proceeds as the insertion of the tuple in FIG. 6. Arrival of the anti-tuple at the same location as the tuple results in deletion of the tuple. Actual removal of the tuple from storage may be performed in several ways. Most simply, upon arrival of an anti-tuple, the storing node checks for the presence of the corresponding tuple. If the corresponding tuple is present, it is removed from storage. Alternatively, the anti-tuple may be stored alongside the tuple, and optionally removed at a later time through a garbage collection process. In this approach, or in an approach in which the tuple is stored indefinitely, the presence of the anti-tuple alongside the tuple results in the exclusion of the tuple from any subsequent query operations.

Querying

A user wishing to obtain data items from the distributed, ordered tuple store initiates a search by specifying a set of search conditions. Preferably, the search conditions are submitted via a client. To retrieve the desired data items form the distributed, ordered tuple store, the client submits a query to the distributed, ordered tuple store with query conditions corresponding to the search conditions. Preferably, the search conditions and query conditions are expressed as field ranges. The result set of a query, and by extension the search, is the zero or more tuples within the distributed, ordered tuple store that satisfy the query conditions. A tuple satisfies the conditions if, for each specified field range, the value of the field within the tuple is within the specified range. That is, the result set of a query is all tuples within the distributed, ordered tuple store that lie within the subspace of the tuple space specified in the query.

Syntax

As with hosting ranges, a query may be more conveniently expressed using the field values that define the subspace. The query may specify single valued ranges. For example, the query $$Q = (6,9), \tag{13}$$

if submitted to a distributed, ordered tuple store storing tuples in the tuple space of Equation 5, returns as a result the single tuple (6, 9), if it is present within the distributed, ordered tuple store. Alternatively, ranges of values may be specified for each field. For example, the query $$Q = (6,[7,9]) \tag{14}$$

returns a result set containing the tuples (6, 7), (6, 8), and (6, 9), if they are present in the distributed, ordered tuple store.

Handling

The distributed, ordered tuple store handles a query by fanning out the query over a query tree. The query is fanned out through division into subqueries that are forwarded as queries to upstream nodes. The root of the query tree is the server at which the query was submitted. A leaf of the query tree is a node that handles a received query without forwarding subqueries to nodes in its upstream neighborhood. Often, the leaves of the query tree are repositories that retrieve the requested data from permanent storage, though other types of nodes may serve as leaves by retrieving cached data.

Upon receiving a query, a node partitions the query into a set of subqueries. The node retrieves a set of tuples from storage for those subqueries that are within its hosting range and, optionally, those subqueries that are within its storage range but not its hosting range, i.e. temporarily stored items. Each remaining subquery is forwarded, as a query, to one or more nodes in its upstream neighborhood that provide coverage for the subquery. The node then waits for sets of tuples from any upstream nodes to which it has forwarded a subquery. Upon receiving the set of tuples, the node merges the received sets of tuples with the sets of tuples retrieved from storage and returns the merged set of tuples to the downstream node from which it received the query. Generally, the merged set of tuples returned by a node, either to a downstream node or to the client, is returned in an ordered arrangement.

Note that in the case of a leaf, no subqueries are forwarded, and the set of tuples retrieved from storage is returned immediately. In the case of a root, i.e. a server, the merged set of tuples is returned to the client. Because clients may only connect to servers, i.e. nodes of rank zero with full coverage, and because nodes only forward subqueries to nodes with a hosting range covering the subquery, a node never receives a query for which it offers no coverage. Finally, a node does not forward queries downstream, that is, towards peers of lower rank.

As noted above, merging set of tuples near the root of the query tree can lead to bottlenecking, especially in distributed, ordered tuple store exhibiting a high degree of branching and in response to queries that generate a large number of results. More detail about the merging and ordering processes and a mechanism for limiting the number of results returned to relieve the bottlenecking problem are provided in the discussions of total ordering and paging below.

Wildcard Values

The specification of a tuple may also allow for a wildcard or "don't care" field value for one or more of the fields within the tuple space. For example, the insertion operation propagates the anti-tuple (*, 6, 1) to all nodes with a hosting range encompassing a field value of 6 for the second field. Arrival at these nodes results in the deletion of all tuples of the form $(f_1, 6, 0)$, where $f_1$ is any field value selected from the field $F_1$. Thus, in the network of FIG. 5, the tuple propagates to, and deletes, any matching tuples stored at nodes $N_b$ and $N_c$.

The symmetry of the insertion and deletion operation suggests that a wildcard field value may also be used in the insertion process. After insertion, a tuple containing a wildcard propagates to all nodes for which the explicitly specified field values are within the hosting range. Upon arrival at these hosting nodes, all tuples within the node's hosting range that match the tuple containing the wildcard are stored. However, because this operation generally results in a broad, untargeted insertion, it may not be appropriate for many distributed, ordered tuple stores.

Queries may also use wildcard values. For example, the query $$Q=(3,*) \qquad (15)$$

is satisfied by all tuples within the distributed, ordered tuple store that have a value of 3 in the first field, regardless of the value in the second field. In some embodiments of the invention, the query syntax may not require the user to specify ranges for all fields, and those fields that are not specified are treated as if a wildcard value were specified.

Total Ordering

The tuples within the distributed, ordered tuple store are characterized by a total ordering. The purpose of the total ordering is to provide an ordinal ranking for each data item that facilitates a deterministic ordering of the data items within the data store and within sets of tuples. Generally, the ordinal ranking is based upon one or more of the ordered lists of values from which the values of a tuple are chosen, i.e. fields described by Equation 1.

Globally Unique Identifier

In the preferred embodiment of the invention, the ordinal ranking is based upon a globally unique identifier.

Single Field GUID

In one embodiment of the invention, a single field within the tuple space serves as a GUID. The ordinal ranking provided by a single field GUID is based upon the ordered list of values from which the field value within the tuple is chosen, e.g. the ordered list of values described in Equation 3. Often, the GUID is a field of numeric values with increasing ordinal rankings corresponding to increasing numeric values. For example, suppose the fields within a tuple correspond to the first name, last name, and social security number of an individual, with the social security number unique to each tuple. In this case, the social security number field may be used as a GUID, with the total ordering of the tuples corresponding to an ordering of individuals by increasing social security number.

Time-Based GUID

A particularly useful single field GUID is a time-based GUID in which a server places a unique time-based value into a field within each tuple upon insertion into the distributed, ordered tuple store. The GUID may be a timestamp, for example a Unix timestamp indicating the number of seconds since the Unix Epoch on 1970 Jan. 1. Alternatively, if greater precision is desired, an NTP timestamp may be used. To ensure consistency among widely separated nodes, the timestamps is preferably based on a common time zone, such as GMT.

Time- and Machine-Based GUID

While the increased temporal resolution offered by timestamps such as the NTP timestamp make the likelihood of truly simultaneous insertions at disparate clients exceedingly unlikely, an identifier based on a timestamp alone may not guarantee global uniqueness. Therefore the preferred embodiment of the invention uses a GUID incorporating both a timestamp and a unique machine identifier indicating the server at which the entry is inserted into the distributed, ordered tuple store. The GUID may be formed by catenating the local server time at the time of insertion and the unique machine identifier, with the local time providing the higher order information.

The machine identifiers may be assigned to servers at the time of manufacture, on a random basis as the servers are started, or based on the physical location of the servers. If the server clock providing the local server time is not sufficiently precise to ensure that multiple operations do not occur at the same time, the value of a counter that increases with each successive operation of the server could be combined with the GUID containing the time and machine identifier.

The distributed method of generating a GUID described above avoids the network congestion that results in a system assigning GUIDs based on a counter maintained by a single machine. Furthermore, a GUID containing both time and server information can provide important functionality in the insertion operation described above and illustrated in FIG. 6. As noted, the topology and hosting ranges of some distributed, ordered tuple stores may result in a single insertion request arriving at a particular node more than once. By inspecting the GUID of an insertion request upon arrival, a node may determine whether it has already handled the particular insertion quest. If so, the node may ignore the insertion request.

GUIDs and Redundancy

The unique nature of a GUID does not necessarily imply that a particular GUID appears only once within the distributed, ordered tuple store. As noted in the discussion of FIG. 6, it is possible in some embodiments of the invention for a particular tuple to be stored in multiple nodes. Such redundant storage does not corrupt the unique nature of the GUID, because it is still correct to say that no two tuples are characterized by the same GUID. Rather, the same tuple has merely been stored in more than one location.

Multiple Field Total Ordering

In still other embodiments of the invention, the total ordering is based on multiple fields within the tuple. The particular fields incorporated into the total ordering are chosen such that no two tuples within the tuple space are characterized by the same ordinal ranking. In this approach, different operations, in particular different queries, may use different total orderings, with a user specifying a particular method of computing the ordinal rankings upon posing a query. The user is thus able to specify an ordering of the query results based on a successive sorting of tuples using the multiple fields. If the fields specified by the user do not contain a subset of fields, such that no two tuples have the same values for each of the fields in the subset, then fields are added to the specified fields until the specified fields include such a subset. The addition of fields may be performed automatically or by the user in response to a prompt. To ensure that the additional fields do not disrupt the intended ordering of the user, the additional fields are added as the least significant fields within the total ordering.

Returning to the example of a tuple with fields corresponding to the first name, last name, and social security number of an individual, suppose a user wishes to obtain results ordered by last name then first name, as in a phone book. The user may specify a total ordering based on the last name and first name fields, with the last name serving as the more significant field. If there exist tuples within the distributed, ordered tuple store that contain the same first and last name, the social security number field may be added to the total ordering as the least significant field. The addition of the social security number as the least significant field yields an ordering that is both deterministic and consistent with the intent of the total ordering initially specified by the user.

Stateless and Lock-Free Paging

Bottlenecking Problem

In many instances, a search submitted to a client by a user contains a set of search conditions satisfied by a large number of tuples within the distributed, ordered tuple store. For example, a set of search conditions that specifies within its set of ranges an entire tuple space produces a result set consisting of every tuple within the tuple space stored in the distributed, ordered tuple store. Search conditions incorporating wildcards may also yield very large result sets. When responding to queries with query conditions based on such search conditions, merging sets of tuples as they are forwarded downstream towards the server requires substantial resources at a number of nodes over a substantial period of time. Providing a complete result set when responding to such queries would render the distributed, ordered tuple store unable to handle other operations while responding to the query. As a result, pending operations would accumulate at servers and overflow any buffers used to store pending operations. This bottlenecking problem merely worsens as the number of nodes and tuples in a distributed, ordered tuple store increases. Clearly, there is a need to restrict the amount of node resources that can be consumed by a single query in a given period of time, preserving sufficient bandwidth for the execution of other operations.

Paging Concept

To address this potential problem, the invention provides a paging mechanism in which the distributed, ordered tuple store successively returns subsets of a complete result set, termed pages, in response to searches with large result sets. Each successive page is produced in response to a query with query conditions corresponding to the search conditions. If, upon return of a page, more results are desired, a subsequent query is submitted to the distributed, ordered tuple store to produce another page. A single search may thus entail the submission of multiple queries.

Paging allows each node to restrict the number of results returned in responding to a query, thus imparting a granular nature to the work performed and the data handled by the distributed, ordered tuple store. This allows multiple operations to be interleaved more readily. Consequently, paging allows comparatively simple operations, such as single tuple insertions and deletions, to complete while searches with large result sets continue to progress.

Benefits of a Stateless and Lock-Free Approach

If a search in progress were to require information about the state of the search to be stored within the distributed, ordered tuple store between successive pages, having many searches in progress at once could potentially overload the nodes within the distributed, ordered tuple store. It is therefore desirable that the approach to paging be stateless, i.e. requiring little or no state to be stored within the distributed, ordered tuple store between the submission of successive queries and the return of successive pages. Furthermore, if a search in progress were to require that a range of the data within the distributed, ordered tuple store be locked, denying other operations such as insertions or deletions access to the data between the return of successive pages, then insertions and deletions would accumulate at nodes affected by the locks, potentially leading to a buffer overflow. It is therefore also desirable that the approach to paging be lock-free, i.e. operating without need for locking data within the distributed, ordered tuple store.

Accordingly, the proposed approach to paging operates without storing the state of searches or locking data in the distributed, ordered tuple store between the successive return of pages. This allows insertion and deletion operations to proceed interleaved with the handling of the successive query operations of a search, yet avoids the potential data overflow associated with a high volume of query operations, and avoids the potential buffer overflow associated with insertions and deletions attempting to access locked data.

Marker

In the preferred embodiment of the invention, stateless, lock-free paging is achieved using a marker. This approach requires that each tuple in a tuple space of the distributed, ordered tuple store possess an ordinal ranking that is determined by using one of the total ordering methods described above. Then:

In response to an initial query received from a client, the distributed, ordered tuple store returns an initial page containing the subset of p tuples having lowest ordinal ranking.

To request a subsequent page, the client submits a subsequent query including a marker indicating the greatest ordinal ranking among the ordinal rankings of the results in the initial page.

In response to the subsequent query received from a client, the distributed, ordered tuple store returns a subsequent page containing the subset of p tuples having lowest ordinal ranking among those tuples having ordinal ranking greater than that of the marker.

Thus, the marker returned to the client by the distributed, ordered tuple store in response to the initial query in the form of the greatest ordinal ranking indicates the extent of the results returned in the response to the initial query. If the ordinal rankings are based on a GUID, the marker returned with the initial query is the GUID having the greatest ordinal ranking among the GUIDs of the tuples within the initial page.

By submitting the marker to the distributed, ordered tuple store within the subsequent query, the client ensures that the subsequent page of results is disjoint from the initial page of results. Specifically, the results returned in each subsequent page have ordinal ranking greater than the greatest ordinal ranking among the results in any previous page. Results are thus not repeated from one page to the next. In contrast to a cursor in a conventional database, which is a data structure stored within the database to indicate the current entry within a list of results, the marker is a stateless, virtual cursor in that it need not be stored within the distributed, ordered tuple store between successive pages. Additionally, the use of a marker as described in the procedure above obviates the need for locking data between successive pages.

Page Size

The number p of results returned in each page is termed the page size. A set of tuples of this size is termed a full page. The page size may be configured, e.g. by a system administrator, to be the same for every node, initial page, and subsequent page. Alternatively, the page size may be specified on a case by case basis, e.g. by a system administrator when configuring individual nodes within the system or by a user when submitting an initial or subsequent query. Such specification allows the page size to be varied based on any combination of node, query, and page. As noted above, the total ordering upon which paging is based may also be specified by the user upon submitting a query. In the preferred embodiment of the invention, if no total ordering or page size is specified, a default page size is implemented using ordinal rankings based on a time- and machine-based GUID. By always enforcing a default page size, the data store bounds the amount of computation and storage required of each node per query, and the benefits of paging are thus provided without requiring user knowledge of the paging mechanism.

If a node responding to a query can retrieve from within its local store of tuples at least enough results to produce a full page, the node returns a full page. Otherwise, the node returns as many results as possible. While page size may vary from node to node, the page size for each node in the query tree must be at least as large as the page size for any node along the path back to the root node to ensure proper functioning of the gathering and merging operations discussed below.

Mechanics of Paging, Gathering, and Merging

Providing paging functionality requires an extension of the query handling procedure outlined above. Specifically, upon receiving a query, either from a client or a downstream node, a node:

Partitions the query into one or more subqueries.

Retrieves from the local store a page of results for each of a subset of the subqueries. For each such subquery, the node retrieves from the local store the p tuples having lowest ordinal ranking among those tuples having ordinal ranking greater than that of the marker, if any marker was received within the query.

Forwards each of the remaining subqueries, as a query, to one or more nodes in its upstream neighborhood that provide coverage for the subquery.

Receives a return page from each upstream node to which it has forwarded a subquery.

Gathers a set of pages including those pages containing tuples obtained from the local store and those pages received in response to forwarded subqueries.

Merges the gathered pages to create a return page.

Returns the return page to the downstream node from which it received the query.

Several special cases of the above generalized procedure should be noted. In the case of a leaf of the query tree, because there is no upstream neighborhood to which the node may forward queries, the node itself retrieves a page of results for all of the subqueries. Effectively, then, a leaf may bypass the partitioning and forwarding operations and return results immediately. In the case of a root of the query tree, i.e. a server, the return page is returned to the client that submitted the query. Finally, it is important to note that the page of results is only limited by a marker if one is received within the query.

Generally, the partitioning operation is based on the storage range of the node and the coverages of the nodes in its upstream neighborhood. Preferably, the subqueries are constructed such that a maximum amount of data can be retrieved from within the storage of the partitioning node. However, the node may also consider its current loading levels when partitioning. For example, a busy node may elect to forward on subqueries for which it could have retrieved results from the local store.

The merging operation can be accomplished using any one of several techniques. In one embodiment of the invention, the node computes the union of the gathered pages, orders the tuples within the union based on the total ordering, and selects the p tuples with the lowest ordinal rankings to create the return page. This can be accomplished with a pointer-based merging operation in which the node:

Orders the results within each of the gathered pages.

Allocates a set of pointers, one pointer for each gathered page, each pointing to the tuple within the page with the lowest ordinal ranking.

Chooses from among the tuples designated by the pointers the tuple with the lowest ordinal ranking.

Adds the chosen tuple to the return page.

Advances the pointer corresponding to the chosen tuple to the tuple within the corresponding gathered page with the next lowest ordinal ranking. If there is no such tuple, the pointer is destroyed.

Because upstream nodes preferably provide return pages that are themselves ordered, the ordering operation that begins the pointer-based merging procedure may in many instances be skipped. Notably, the merging procedure above itself yields an ordered return page. Thus, if the pointer-based merging procedure is implemented consistently across all nodes within a distributed, ordered tuple store, it may be implemented without the initial ordering operation, provided the leaves within the query tree return ordered results.

In GUID-based distributed, ordered tuple stores providing redundant storage, it may be desirable to ensure that the return page does not contain duplicate results, i.e. two copies of a tuple with a particular GUID. The merging process may additionally include a comparison operation to ensure that no two results within a return page have the same GUID. For example, in the pointer-based merging procedure, upon advancing the pointer to the tuple with the next lowest ordinal ranking, the GUID of the next tuple may be compared to that of the tuple added to the return page. If the GUIDs are the same, the pointer is again advanced to the tuple with the next lowest ordinal ranking. Elimination of duplicate tuples may not be desirable in some instances, however, such as in queries posed to assess the degree of redundant storage within a distributed, ordered tuple store.

FIGS. 7-12 provide a detailed example of the paging procedure. The example is based on a distributed, ordered tuple store storing tuples in the tuple space $$S_3 = \{F_6, F_7\} = \{[a,z], [1,9999]\} \quad (16)$$

in which the final field $F_7$ is a GUID. The distributed, ordered tuple store implements a default page size of two tuples.

Figure 7:
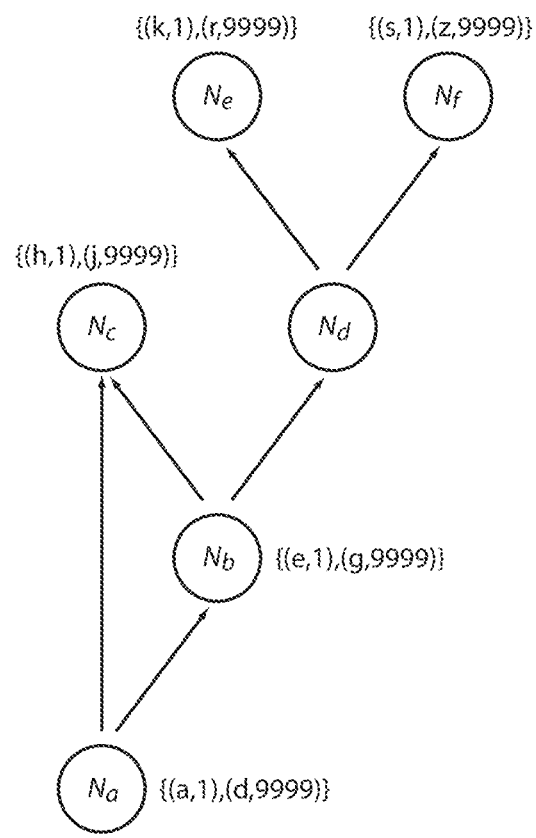
FIG. 7 shows a set of hosting ranges for the distributed, ordered tuple store of FIG. 1.
Figure 8:
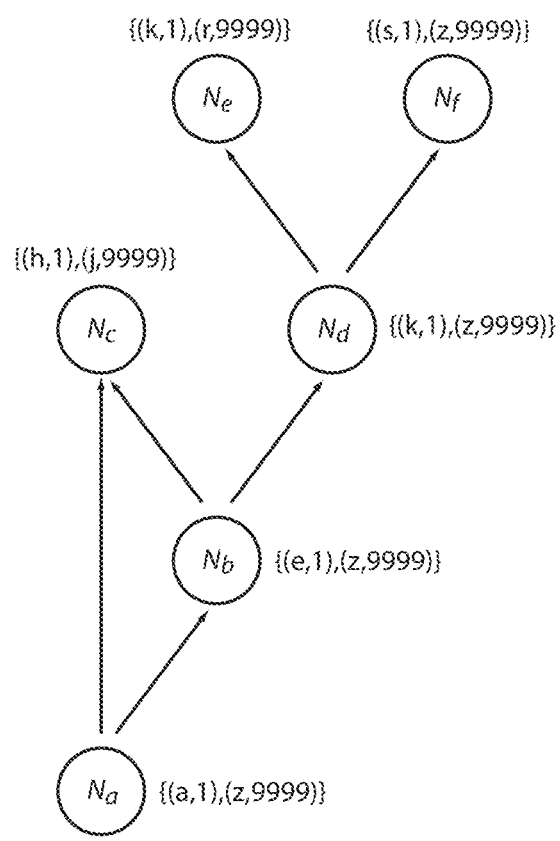
FIG. 8 shows the coverages resulting from the hosting ranges of FIG. 7.
Figure 9:
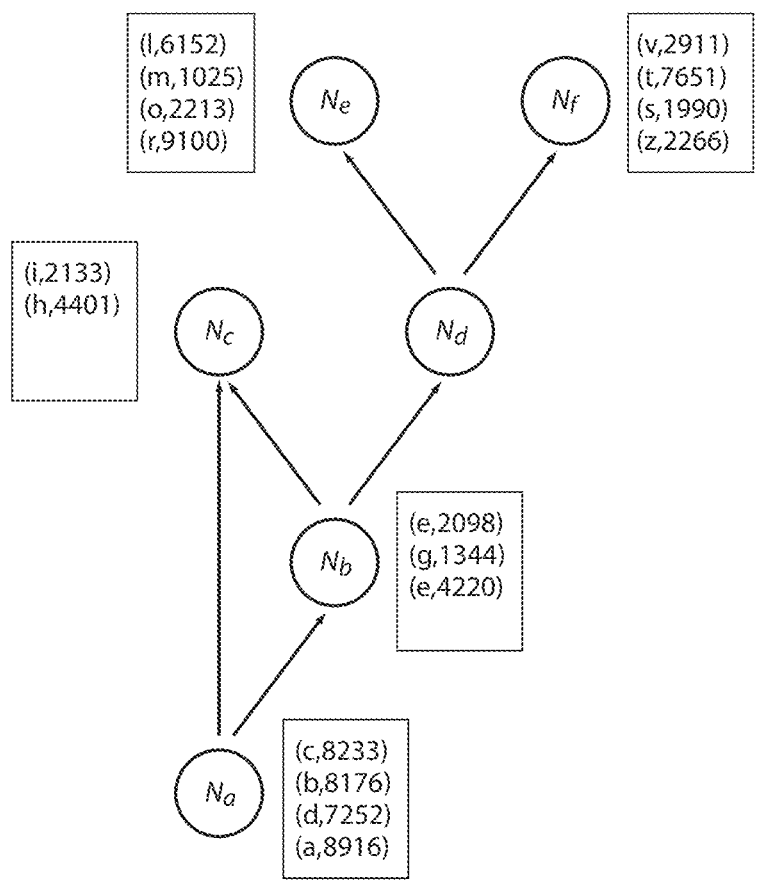
FIG. 9 shows a set of tuples stored in each node within the distributed, ordered tuple store of FIG. 1 with the hosting ranges of FIG. 7.

FIG. 7 shows a set of hosting ranges for the distributed, ordered tuple store of FIG. 1, and FIG. 8 shows the coverages resulting from the hosting ranges of FIG. 7. FIG. 9 shows a set of tuples stored in each node within the distributed, ordered tuple store of FIG. 1 with the hosting ranges of FIG. 7.

Figure 10:
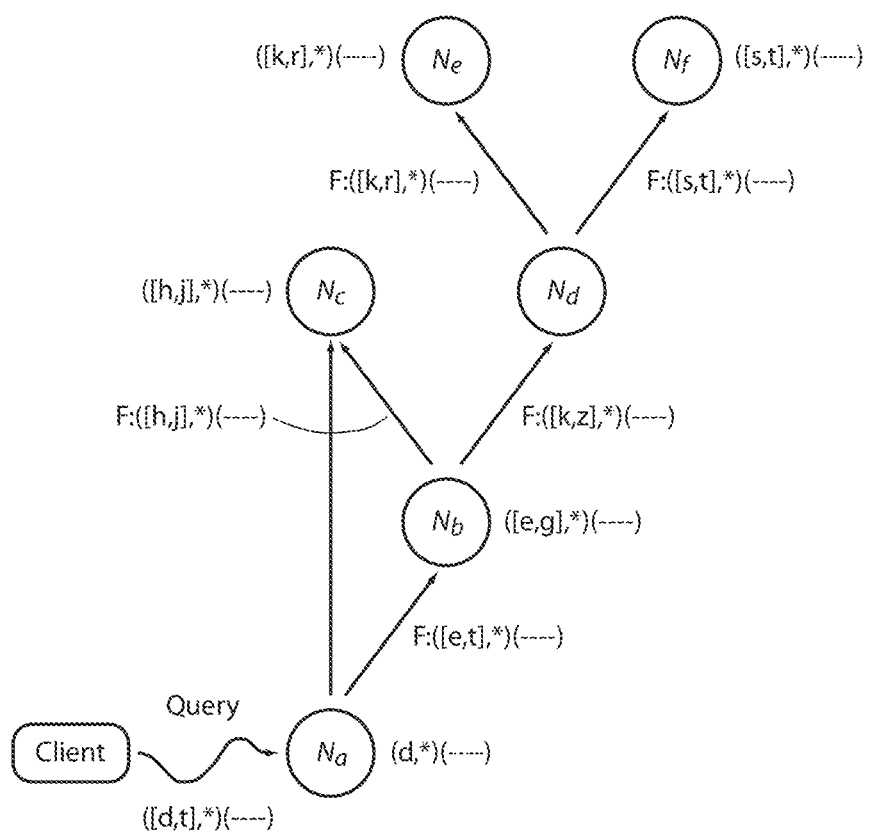
FIG. 10 shows a query submitted to the distributed, ordered tuple store of FIG. 1 with the hosting ranges of FIG. 7.

FIG. 10 shows a query submitted to the distributed, ordered tuple store of FIG. 1 with the hosting ranges of FIG. 7. The query submitted by the client to the server $$Q = ([d,t], *)(----) \quad (17)$$

is an initial query in that the marker (----) is unspecified. The server, node $N_a$, partitions the query into two subqueries based on its hosting range and the hosting range of the nodes in its upstream neighborhood. Specifically, node $N_a$ partitions the query into subqueries $$Q_a^a = (d, *)(----) \quad (18)$$

and $$Q_a^b = ([e,t], *)(----). \quad (19)$$

Node $N_a$ retrieves results for subquery $Q_a^a$ from the local store and forwards subquery $Q_a^b$ on to node $N_b$, as a query. As subquery $Q_a^b$ is also within the coverage of node $N_c$, node $N_a$ could have partitioned the incoming query into three subqueries, sending one subquery to node $N_b$ and one subquery to node $N_c$. However, because the coverage of node $N_c$ is a subset of the coverage of node $N_b$, node $N_a$ in this example elects to forward a single subquery to node $N_b$ in an effort to minimize the number of forwarded subqueries.

Node $N_b$ receives the query and partitions the query into three subqueries $$Q_b^b = ([e,g], *)(----), \quad (20)$$

$$Q_b^c = ([h,j], *)(----), \quad (21)$$

and $$Q_b^d = ([k,z], *)(----). \quad (22)$$

Node $N_b$ retrieves results for subquery $Q_b^b$ from the local store and forwards subqueries $Q_b^c$ and $Q_b^d$ as queries to nodes $N_c$ and $N_d$, respectively.

Nodes $N_c$ and $N_d$ receive the respective queries. The partitioning and forwarding procedure continues in a similar manner at node $N_d$, which forwards subqueries to nodes $N_e$ and $N_f$. Nodes $N_c$, $N_e$, and $N_f$ are leaf nodes, and therefore do not forward any subqueries. In the case of the leaf nodes, the received queries are partitioned into a single subquery that is retrieved from the local store, as shown in FIG. 10.

Figure 11:
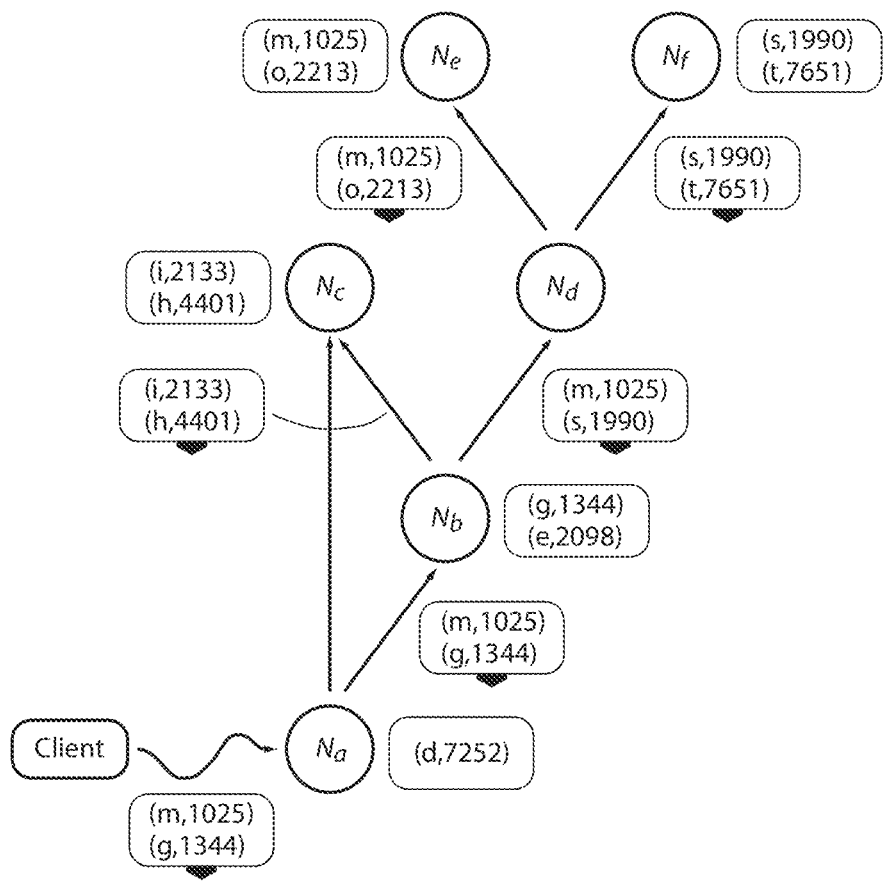
FIG. 11 shows an initial page of results returned to the client for the query of FIG. 10.

FIG. 11 shows an initial page of results returned to the client for the query of FIG. 10. As described in the query handling procedure above, this page of results is formed through a sequence of receiving, gathering, and merging operations. The sequence begins with the leaf nodes, which, awaiting no results from forwarded subqueries, provide a return page containing the results obtained directly from the local store in responding to the received queries. For example, node $N_f$ retrieves the page $$P_e^e = (m, 1025), (o, 2213) \quad (23)$$

from the local store and provides a return page $$P_e^d = (m, 1025), (o, 2213) \quad (24)$$

containing the same tuples to node $N_d$. Note that the tuples retrieved and provided by node $N_e$ are the p tuples within storage with GUIDs having lowest ordinal ranking. As noted, in this example p=2 and two tuples are provided in the return page.

Node $N_d$ receives the return page from node $N_e$ and similarly receives a return page from node $N_f$. Node $N_d$ merges the two received return pages with the results it has retrieved from the local store. However, because node $N_d$ is a relay node with no storage there are no such results. Node $N_d$ therefore merely merges the two received return pages to create a return page containing the tuples with the lowest ordinal ranking among the received return pages based on the GUID. The resulting return page is provided to node $N_b$.

Node $N_b$ receives the return page $$P_d^b = (m, 1025), (s, 1990) \quad (25)$$

from node $N_d$ and similarly receives a return page $$P_c^b = (i, 2133), (h, 4401) \quad (26)$$

from node $N_c$. Node $N_b$ merges the two received return pages with the page of results it has retrieved from the local store $$P_b^b = (g, 1344), (e, 2098). \quad (27)$$

Node $N_b$ merges pages $P_d^b$, $p_c^b$, and $p_b^b$ to create a return page containing the two tuples with the lowest ordinal ranking among the three pages. The resulting return page is provided to node $N_a$.

A similar merging operation is performed at node $N_a$. Of note, the page of results obtained from the local store by node $N_a$ is not a full page because only one tuple within storage satisfies the query conditions. The return page created $$P_a^C=(m,1025),(g,1344) \qquad (28)$$

is provided to the client as a response to the submitted query.

Figure 12:
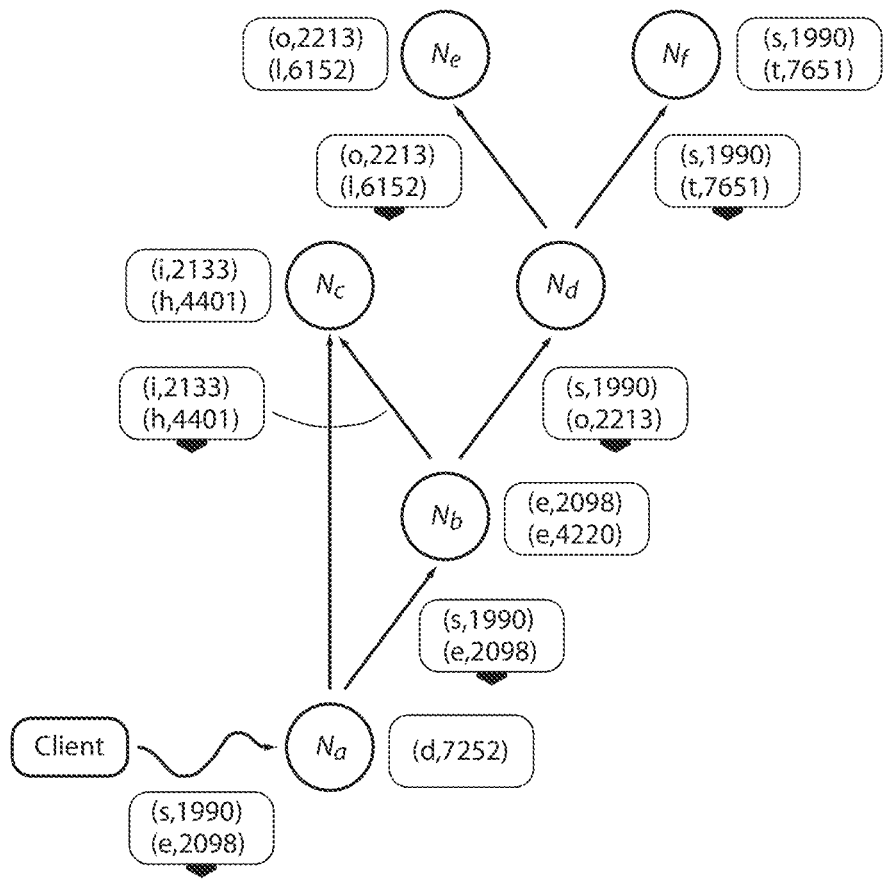
FIG. 12 shows a subsequent page of results returned to the client for a subsequent query following the query of FIG. 10.

FIG. 12 shows a subsequent page of results returned to the client for a subsequent query following the query of FIG. 10. To request the subsequent page of results, the client submits a subsequent query similar to the initial query, but additionally including a marker indicating the GUID having highest ordinal ranking among the GUIDs of the tuples returned in the initial return page. Specifically, the client submits a query $$Q=([d,t],*)(1344) \qquad (29)$$

The partitioning, forwarding, receiving, gathering, and merging of results proceeds in a manner similar to that described in FIG. 11. However, in retrieving tuples from the local store, each node ensures that the tuples retrieved have a GUID having ordinal ranking higher than that of the marker GUID, $$M=1344. \qquad (30)$$

Consequently, those nodes that retrieved the tuples in the initial return page, i.e. nodes $N_b$ and $N_e$, retrieve a different page of results from the local store in responding to the subsequent query.

This alters the return pages provided by these nodes and nodes downstream of these nodes. The result pages retrieved from the local store and the return pages provided by each node are as shown in FIG. 12. The final return page provided to the client is $$P_a^C=(s,1990),(e,2098). \qquad (31)$$

Thus, as desired, the two tuples returned in response to the initial query are the two tuples with GUIDs having lowest ordinal ranking throughout the distributed, ordered tuple store, while the two tuples returned in response to the subsequent query are the tuples with GUIDs of third and fourth lowest ordinal ranking.

Using Storage and Computation to Speed Paging

If additional storage is available at nodes between the return of successive pages, the speed of the paging process may be increased using the pointer-based merging procedure. Specifically, it is possible to reduce the number of results that must be provided in gathered pages for creation of return pages subsequent to the first return page.

To achieve this increase in speed, after completing the merging operation, a node:

Stores the ordered results within each gathered page that were not included in the return page as a partial gathered page.

Then, upon receipt of a query requesting a subsequent return page, the node:

Obtains a truncated page of results for each stored gathered page containing only as many data items as were included from the gathered page in the previous return page. The node obtains the truncated page of results by either:

retrieving a truncated set of tuples from the local store; or forwarding a query with a reduced page size and a marker indicating the last merged data item to the node that provided the corresponding gathered page in response to the previous query, depending on whether the gathered page was obtained from the local store or received from an upstream node.

Orders the results within the truncated page of results.

Appends the truncated page of results to the truncated gathered page to complete the gathered page.

The completed gathered page may then be merged, as described in the pointer-based merging procedure. Note that if no results from a gathered page are included in a return page, then no new results need be obtained from the source providing the gathered page, whether from local storage or an upstream node, in creating a subsequent return page. Similarly, if the number of results remaining in a gathered page after removal of results for inclusion in the return page is at least as large as the number of results in the return page, then there is no need to obtain more results for the subsequent return page. Finally, if additional computational resources are available at a node after providing a return page, the node may use the resources to obtain and merge gathered pages in anticipation of a subsequent query, either from the local store or from nodes in its upstream neighborhood.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following Claims.

What is claimed is:

1. A method for managing data in a distributed ordered tuple store, the distributed ordered tuple store comprising a plurality of interconnected nodes, each of the plurality of interconnected nodes having a rank relative to each other, the method comprising:

receiving, by a first node of the plurality of nodes, a first request to insert a first tuple into the distributed ordered tuple store;

determining, by the first node, that the first tuple is within a hosting range of the first node based on a rank of the first node in the distributed ordered tuple store; and storing, by the first node, the first tuple locally at the first node in response to determining that the first tuple is within a hosting range of the first node.

2. The method of claim 1, further comprising:

receiving, by the first node, a second request to insert a second tuple into the distributed ordered tuple store;

determining, by the first node, that the second tuple is not within a hosting range of the first node based on the rank of the first node in the distributed ordered tuple store; and forwarding, by the first node, the second request to a second node of the plurality of nodes in response to determining that the second tuple is not within a hosting range of the first node.

3. The method of claim 2, wherein the second node has a second rank in the distributed ordered tuple store, and wherein the second rank of the second node is superior to the first rank of the first node.

4. The method of claim 2, further comprising:

before forwarding the second request to the second node:

identifying, by the first node, one or more of the plurality of nodes that have superior rank to the first rank of the first node and that provide coverage for the second tuple; and forwarding, by the first node, the second request to each of the identified one or more of the plurality of nodes;

wherein the second node is one of the identified one or more of the plurality of nodes.

5. The method of claim 1, further comprising:
identifying, by the first node, one or more of the plurality of nodes that have superior rank to the first rank of the first node and that provide coverage for the first tuple; and
forwarding, by the first node, the first request to each of the identified one or more of the plurality of nodes.

6. The method of claim 1, further comprising:
receiving, by the first node, a second request;
determining, by the first node, that the second request is a duplicate of the first request and that the first tuple is already stored locally at the first node; and
ignoring, by the first node, the second request in response to determining that the second request is a duplicate of the first request and that the first tuple is already stored locally at the first node.

7. The method of claim 1, wherein the first request is received, by the first node, from a client.

8. The method of claim 1, wherein the first request is received, by the first node, from a second node of the plurality of nodes, wherein the first request was previously received, by the second node, from a client, and wherein the second node forwarded the first request to the first node.

9. The method of claim 1, further comprising:
before storing the first tuple locally at the first node:
inspecting, by the first node, a first identifier associated with the first request; and
determining, by the first node, that the first request has not already been handled by another node of the plurality of nodes based on the inspection of the first identifier;
wherein the first tuple is stored locally at the first node further in response to determining that the first request has not already been handled by another node of the plurality of nodes.

10. The method of claim 1, further comprising:
receiving, by the first node, a second request to insert a second tuple into the distributed ordered tuple store;
inspecting, by the first node, a second identifier associated with the second request;
determining, by the first node, that the second request already been handled by another node of the plurality of nodes based on the inspection of the second identifier; and
ignoring, by the first node, the second request in response to determining that the second request has already been handled by another node of the plurality of nodes.

11. The method of claim 1, wherein the first tuple includes a deletion field, and wherein the first request is interpreted as a request to insert the first tuple into the distributed tuple store based on a value in the deletion field of the first tuple.

12. The method of claim 1, further comprising:
receiving, by the first node, a second request associated with a second tuple, wherein the second tuple includes a deletion field;
determining, by the first node, based on a value in the deletion field of the second tuple, that the second request is to delete the second tuple from the distributed storage field;
determining, by the first node, that the second tuple is stored locally at the first node; and
deleting, by the first node, the second tuple in response to determine that the second request is a request to delete the second tuple and that the second tuple is stored locally at the first node.

13. A method for managing data in a distributed ordered tuple store, the distributed ordered tuple store comprising a plurality of interconnected nodes, each of the plurality of interconnected nodes having a rank relative to each other, the method comprising:
receiving, by a first node of the plurality of nodes, a first request including a first tuple;
determining, by the first node, based on one or more values included in the first request, that the first request is to insert the first tuple into the distributed ordered tuple store and that the first tuple is within a hosting range of the first node; and
storing, by the first node, the first tuple locally at the first node in response to determining that the first request is to insert the first tuple into the distributed ordered tuple store and that the first tuple is within a hosting range of the first node.

14. The method of claim 13, wherein determining that the first request is to insert the first tuple into the distributed tuple store includes:
reading a value in a deletion field associated with the first tuple; and
determining, based on the value in the deletion field, that the first tuple is not an anti-tuple.

15. The method of claim 13, further comprising:
receiving, by the first node, a second request including a second tuple;
determining, by the first node, based on one or more values included in the second tuple, that the second request is to delete a third tuple from the distributed ordered tuple store and that the third tuple was previously stored locally at the first node;
deleting, by the first node, the previously stored third tuple in response to determining that the second request is to delete the third tuple from the distributed ordered tuple store and that the third tuple was previously stored locally at the first node.

16. The method of claim 15, wherein determining that the second request is to delete the third tuple from the distributed tuple store and that the third tuple was previously stored locally at the first node includes:
reading a first value and a second value associated with the second tuple, the first value associated with a first field and the second value associated with a second field, wherein the first field is a deletion field;
determining, based on the first value, that the second tuple is an anti-tuple; and
determining, based on the second value, that the anti-tuple corresponds to the previously stored third tuple.

17. The method of claim 13, further comprising:
determining, by the first node, that the first tuple is within a hosting range of the first node based on a rank of the first node in the distributed ordered tuple store;
wherein the first tuple is stored locally at the first node further in response to determining that the first tuple is within the hosting range of the first node.

18. The method of claim 13, further comprising:
identifying, by the first node, one or more of the plurality of nodes that have a superior rank to the first node and that provide coverage for the first tuple; and
forwarding, by the first node, the first request to each of the identified one or more of the plurality of nodes.

19. The method of claim 1, wherein the first request is received by the first node from a client or a second node of the plurality of nodes.

20. A computer system associated with a particular node of a plurality of nodes in distributed ordered tuple store, the computer system comprising:
- a data storage device;
- a processor; and
- a memory communicatively coupled to the processor, the memory having instructions stored thereon, which when executed by the processor, cause the computer system to:
  - receive a request including a tuple;
- determine, based on a first value in a first field, that the request is to insert the tuple into the distributed ordered tuple store;
- determine, based on a second value in a second field and on a rank of the particular node in the distributed ordered tuple store, that the tuple is within a hosting range of the particular node; and
- store the tuple locally in the storage device in response to determining that the request is to insert the tuple into the distributed ordered tuple store and that the tuple is within the hosting range of the particular node.

* * * * *